June 13, 1961     A. A. BERNDT     2,988,727
GRIPPING MEMBER FOR LINE CONNECTORS
Filed Feb. 1, 1957     2 Sheets-Sheet 1
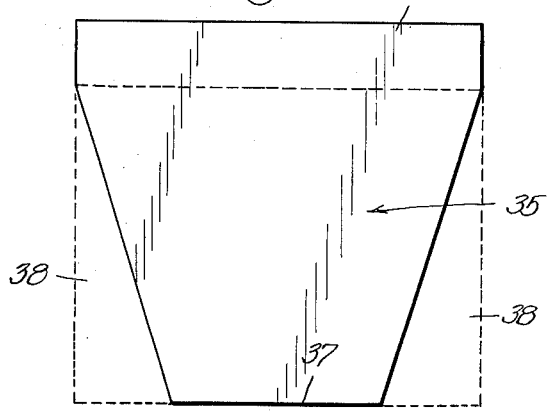
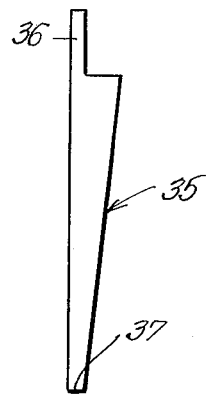
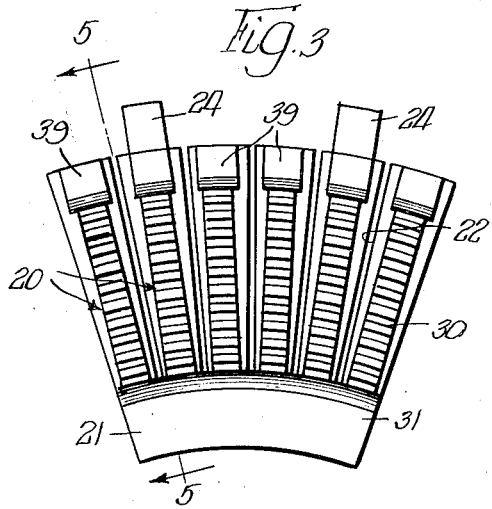
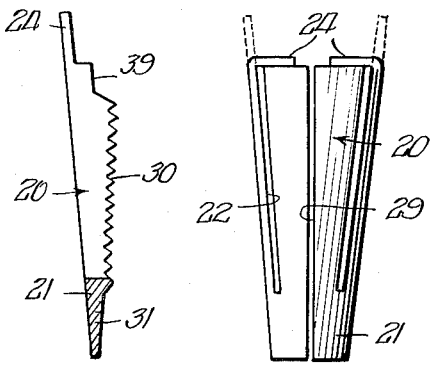
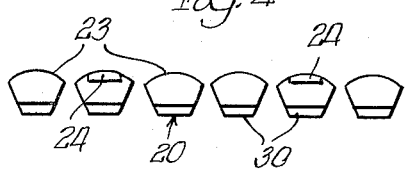
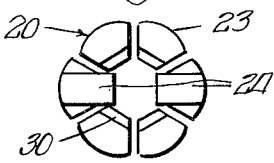
INVENTOR.
Arthur A. Berndt.
BY Byron, Hume, Groen & Clement
attys

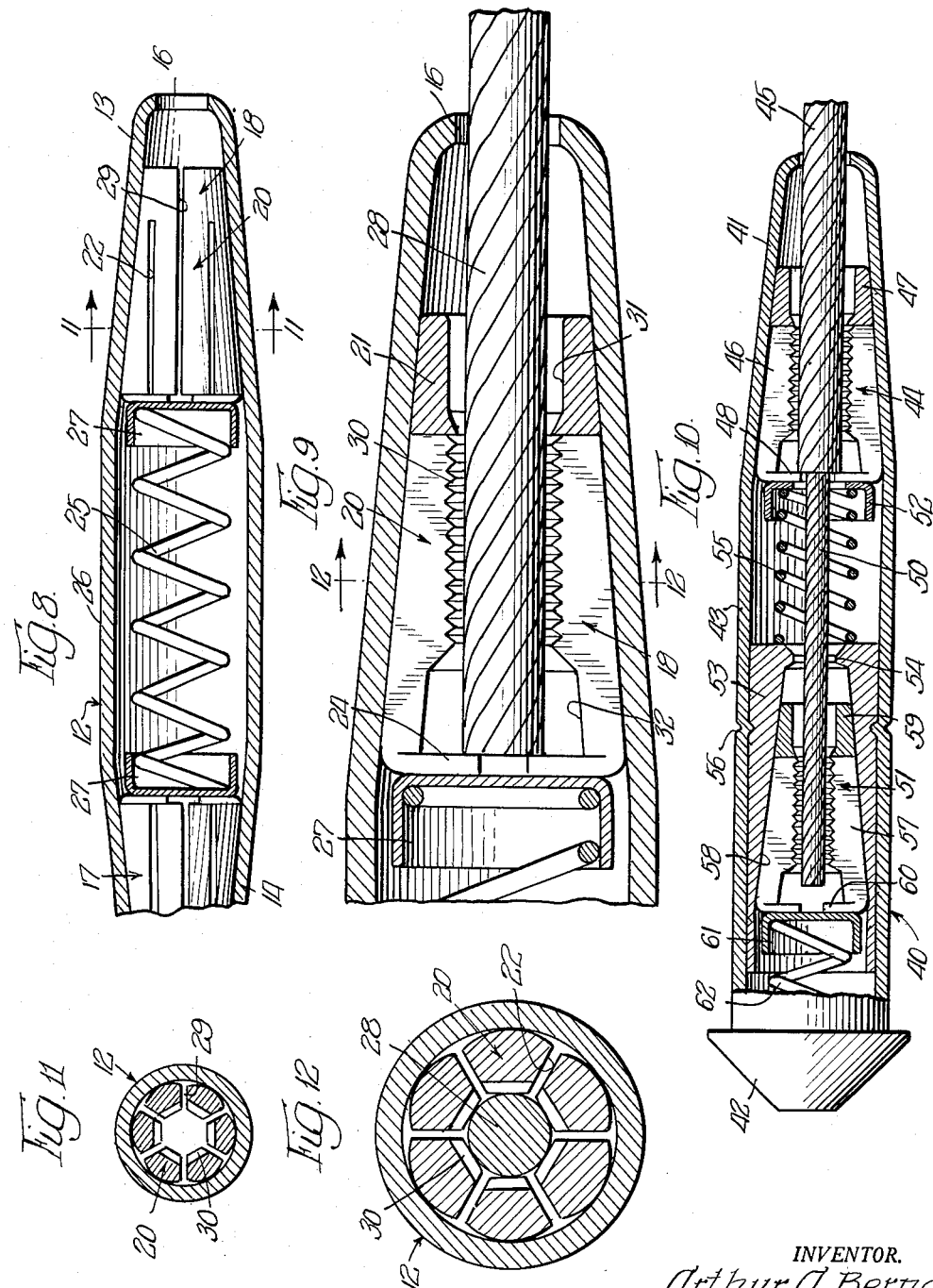

United States Patent Office 2,988,727
Patented June 13, 1961

2,988,727
GRIPPING MEMBER FOR LINE CONNECTORS
Arthur A. Berndt, Chicago, Ill., assignor, by mesne assignments, to The Superior Switchboard & Devices Company, Canton, Ohio, a corporation of Ohio
Filed Feb. 1, 1957, Ser. No. 637,724
5 Claims. (Cl. 339—273)

The invention relates to improvements in connectors for joining wires, cables and the like to effect a strong mechanical and electrical connection and has reference in particular to a novel and improved gripping member for such connectors which will embody a new and improved design whereby the same can be produced from a single piece of metal.

A general object of the invention is to provide a connector of general utility for mechanically or electrically connecting wires or cables such as used in electrical transmission work, in mechanical apparatus, and in structural work; to provide such a wire connector with gripping members of improved construction whereby the same can be produced from a single piece of metal with consequent reduction in manufacturing costs; and to provide a wire connector wherein the new and improved gripping member thereof will maintain a coordinate alignment of the multiple jaws under all conditions.

A more specific object of the invention resides in the provision of new and improved gripping members for the purposes described wherein the multiple jaws of each member are joined together at their forward outer end and are thus free to move throughout the rest of their length for firm gripping contact with the wire or cable to be connected, and wherein each gripping member can be produced from a single piece of metal by simple stamping and bending operations.

Another object is to provide a gripping member of the character described that can be stamped from a strip of metal and then bent into circular form to comprise the completed article, which can be manufactured in this manner within very close tolerances, and wherein one or more of the gripping jaws are provided with fingers at the rear end thereof and which are bent inwardly to form a stop for the entering wire or cable so that the gripping jaws will be properly positioned with respect thereto.

Another object is to provide a unitary gripping member as described which will embody improved features such as will produce the greatest gripping action at the extreme rear end of the member whereby to completely eliminate the undesirable bite at the forward end where the conductor leaves the gripping member and which has heretofore been the cause of conductor failure.

With these and various other objects in view, the invention may consist of certain novel features of construction and operation, as will be more fully described and particularly pointed out in the specification, drawings and claims appended thereto.

In the drawings, which illustrate an embodiment of the device, and wherein like reference characters are used to designate like parts—

FIGURE 1 is a top plan view of a metal blank from which the present gripping member can be formed;

FIGURE 2 is a side elevational view of the metal blank as shown in FIGURE 1;

FIGURE 3 is a bottom plan view illustrating the shape and constructional features of the gripping member following the forming operations conducted on the metal blank;

FIGURE 4 is a rear end view of the gripping member as shown in FIGURE 3, particularly illustrating the shape and alignment of the gripping jaws thereof;

FIGURE 5 is a sectional view taken substantially along line 5—5 of FIGURE 3;

FIGURE 6 is a view showing the gripping member of the invention in completed form;

FIGURE 7 is a rear elevational view of the completed gripping member shown in FIGURE 6;

FIGURE 8 is a longitudinal sectional view taken through a wire connector which incorporates in its construction the improved gripping member of the invention;

FIGURE 9 is a fragmentary sectional view somewhat enlarged in size for better illustrating the structure of the present gripping member and its gripping action on a conductor having inserted relation within the connector;

FIGURE 10 is a longitudinal sectional view showing a dead-end connector for composite cable and which illustrates the action of tandem gripping members with respect to such composite cable.

FIGURE 11 is a transverse sectional view taken substantially along line 11—11 of FIGURE 8; and FIGURE 12 is a transverse sectional view taken substantially along line 12—12 of FIGURE 9.

Referring to the drawings, and particularly to FIGURES 8 and 9, the connector selected for illustrating the invention essentially consists of a housing or casing of tubular form generally designated by numeral 12 and which may be formed of any suitable metal, preferably steel, copper or aluminum, with at least one end thereof being tapered to form a tapering end portion such as 13. In the illustrated embodiment of FIGURE 8 both ends of the casing are tapered, being reduced in diameter by a swaging operation and accordingly one tapered end is identified by numeral 13, whereas the other tapered end is identified by numeral 14. It will be observed that the metal is arcuately shaped at end opening 16 whereby to form a rounded nose portion at this end of the connector. Said end opening is of course larger in diameter than the wire or cable to be inserted through the opening, and the act of inserting the wire or cable into the connector effects coaction with a gripping member located within the casing. The structure of the gripping member will now be described.

One or more gripping members are employed, the same having location within the tapering end portions, respectively. Gripping member 17 has location within the tapering end portion 14, whereas gripping member 18 has location within the tapering end portion 13. Both members are adapted to have contact with the tapering walls of their respective end portion and each member consists of a plurality of connected gripping jaws 20. In accordance with the invention, the gripping jaws are connected or joined together at their forward ends as at 21 and each jaw is separated for the remainder of its length whereby to permit free movement of the jaws into biting contact with the wire or cable to be gripped thereby. The members 17 and 18 are each formed to provide said gripping jaws by the slots 22 and certain of the jaws are formed with rearwardly extending projections which when bent radially inwardly provide the fingers 24. Said fingers form a stop to limit inserting movement of the wire or cable with respect to the gripping member and which accordingly function to properly position the gripping jaws thereof with respect to the wire or cable to be gripped thereby. For maintaining the gripping members in contact with the tapering walls of the end portions of the casing a coil spring 25 is provided, having location within the cylindrical portion 26 of the casing and being confined between the gripping members. Interposed between the respective ends of coil spring 25 and the associated gripping members 17 and 18 there is located a cup-shaped member 27. It will be observed that each cup-shaped member provides a seat for its respective end of the coil spring and that each member is of a size to move freely within the cylindrical portion of the casing.

The insertion of the cable 28 within opening 16 of the tapering end portion 14, as best shown in FIGURE 9, will force the gripping member 18 in a direction rearwardly of the casing and away from the tapering walls of end portion 14. The action of the gripping member 18 in moving away from the tapering walls, combined with the inserting action of the cable 28, will cause expansion of the member by radial outward movement of gripping jaws 20. Accordingly, the cable 28 is permitted to enter the center passage provided by the gripping member. The operation results in cable 28 becoming operatively associated with the gripping member and as tension is applied to cable 28, the gripping member is again caused to contact the tapering walls of end portion 14 so that the serrated edges or teeth 30 of the gripping jaws are caused to bite into the cable, holding the same joined to the connector. The forward end 21 of each gripping member is formed with a smooth surfaced entrance opening such as 31 so that the cable or wire upon insertion will be properly guided through the central passage of the member. The serrations or teeth 30 formed on the inside surface of each gripping jaws also terminate short of the rear end of each jaw, whereby to form a rear cavity such as 32. The cavity is made to provide clearance for burrs on the end of the conductor. The fingers 24 should be of a length so that when bent inwardly they provide a stop limiting the inserting movement of the wire or cable.

The gripping members 17 and 18 embody certain structural features whereby the same can be produced from a single piece of metal with consequent reduction in manufacturing costs. Referring to FIGURE 1, a metal blank 35 is shown from which the gripping member of the invention can be formed. The blank may be cut from a strip of metal or the same may be produced as a casting of the required shape. The width of the projection 36 determines the maximum width of the strip and since the width of the blank at the forward end 37 is less than its width at said rear end 36, the triangular metal portions 38 are cut from the strip to produce the keystone shape shown in said figure.

Referring to FIGURE 2, it will be observed that blank 35 increases in thickness from the forward end 37 to the rear end adjacent projection 36. In order to form the plurality of connected gripping jaws 20 a series of stamping and cutting operations are performed on the blank, certain operations forming the elongated slots 22, which separate the gripping jaws for the major portion of their length rearwardly of the forward connected end 21. Other operations form the smooth surfaced area 31 at the forward end of the blank and simultaneously produce the stepped surface 39 at the rear, the same forming cavity 32 when the blank is rolled into shape. The serrations or teeth 30 are formed on the inside surface of each jaw member by a stamping operation and a cutting operation removes most of the material of projection 36, leaving, however, a portion remaining in connected relation with certain gripping jaws to form fingers 24. The gripping member is completed by rolling or bending the formed blank into conical shape as shown in FIGURE 6, which shape naturally results by reason of the progressive increase in thickness from the relatively thin forward section 21 to the maximum thickness at the rear termination of the teeth 30. In addition to the slots 22 the completed gripping member will be characterized by a slot 29 which extends longitudinally from end to end of the member.

The completion of the gripping member by the rolling or bending of the blank into conical shape is materially facilitated by the cross-sectional wedge shape of each of the gripping jaws. As best shown in FIGURE 4, each jaw has its maximum width adjacent the outer arcuate surface 23 thereof and from said maximum width each jaw tapers slightly to a minimum width adjacent the serrations or teeth 30. As best illustrated in FIGURE 7, the gripping jaws are spaced uniformly around the periphery when the member is in completed form, and it will also be observed that the spacing between adjacent jaws is uniform for the entire depth of the jaws. However, each jaw is separated from the remaining jaws for the length of slots 22 and this construction is highly desirable since under actual operating conditions the rear of each gripping jaw is free to move into biting contact with the conductor to be joined thereby to produce a secure connection therewith. However, the gripping jaws at their forward connected ends do not have the same freedom of movement and thus the gripping action at this end of the member is materially reduced. As a result the undesirable bite where the conductor leaves the gripping member is completely eliminated so that better performance is obtained with a much longer life for the connection since the undesirable bite at the forward end of the gripping members has been the major cause of failures in the past with wire connectors of this type.

Also in the present line splice the friction between the casing and gripping members is held to a minimum by the arcuate contour of the outer surface 23 of each of the gripping jaws 20. In particular the radius of the outer surface for each gripping jaw is less than the radius of the tapering end portion of the casing. In other words, said outer surface 23 has a curvature such that the radius thereof compared to the radius of the tapering walls of the end portion results in each gripping jaw having contact with the tapering walls along a central area of the outer surface and which will extend for approximately the length of the gripping jaw. This feature is best disclosed in FIGURES 11 and 12. The structure has the advantage of not only reducing the friction between the contacting parts but in addition the structure prevents the concentration of pressure at the edges of the gripping jaws such as would cause the jaws to cut into the casing and so interfere with their free movement within the end portion of the casing. As regards the invention, contact between the gripping jaws 20 and the casing, either 13 or 14, will always occur centrally of the outer curved surfaces 23, insuring minimum friction with a broad smooth contact surface.

In the modification of FIGURE 10, the first gripping member grips and holds the outer strands of the cable and a second gripping member is provided for gripping and holding the center strand of the cable. Referring to said figure, the casing 40 provides a dead-end connector having one tapering end portion 41 and having its other end formed to provide anchoring means 42. A cylindrical portion 43 forms the middle section of the casing. A gripping member 44 embodying the improved features of the invention is located within the tapering end portion 41 and said member has biting contact with the outer strands of a cable 45 such as may be inserted within the dead-end connector for connection therewith. The jaws 46 of the gripping member 44 are joined to each other at the forward end 47 and the fingers 48 provide a rear stop for the cable although the center strand 50 can pass through for coaction with a second gripping member identified by numeral 51. The center strand 50 also passes through an opening in the cup-shaped member 52 and then extends into a metal cage 53 which may be formed of steel or other suitable material. The cage is positioned within cylindrical portion 43 of the casing so that its bevelled opening 54 is toward the coil spring 55 and the cage is secured to the casing by a peening operation which indents the metal of the casing as at 56, the same extending completely around the casing. Since the cage 53 is fixed to the casing, it will be seen that the coil spring 55 bears against the front wall of the cage at one end and seats at its other end in the cup-shaped member 52 so that the action of the spring is to urge the gripping member 44 in a forward direction to maintain the jaws thereof in contact with the tapering surfaces of end portion 41.

The second gripping member 51 is located within cage 53 and the jaws 57 thereof have contact with the tapering surfaces 58 of the cage. This second gripping member also embodies the present improvements since the jaws are joined to each other at the forward end 59 and fingers 60 are provided at the rear, which function as a stop for the center strand 50. The cup-shaped member 61 and the coil spring 62 complete the gripping assembly for the center steel strand and, accordingly, the second gripping member 51 is urged in a forward direction to maintain the jaws thereof in contact with the tapering surfaces of the cage.

The intensity of the grip effected by the first and second gripping members, respectively, can be adjusted by varying the taper of the surfaces with which the elements contact. The particular angle for the taper will vary according to the strength, hardness, conductivity and elasticity of the various metals in the cable. Also the gripping members are separate and they operate independently of each other. It will be appreciated that the gripping member of the invention is of general utility since it can be used in a connector such as shown in FIGURE 8 for splicing a transmission line and the member can also be used in a dead-end connector such as shown in FIGURE 9. The fact that the gripping member can be formed from a single piece of metal makes possible a substantial reduction in manufacturing costs. Following a stamping operation for shaping the metal blank a coin press can be used for shaping the gripping jaws and for forming the teeth thereon. A final stamping operation completes the article, which is then bent or rolled into its final shape, which approximates that of a truncated cone. The gripping jaws are free at their rear ends to be compressed radially inward by movement of the member forwardly within its respective tapering portion and accordingly the jaws at their rear ends will effect a full bite into the conductor. However, the teeth of the jaws adjacent the forward connected end of the member do not bite into the conductor to any extent and between these two extremes the grip of the member on the conductor tapers off gradually, both in depth and compression. The action is such as to produce the ideal grip for developing the maximum holding effect and additionally, by eliminating the undesirable bite at the forward end of the member, conductor failure from this source is entirely eliminated.

As a result of the method of manufacture the teeth on the gripping jaws are approximately flat and thus they have substantially a line contact with the conductor for gripping the same. Accordingly, an advantage exists in providing a plurality of gripping jaws since by increasing the number of jaws the line contacts which the gripping member has with the conductor is increased to thus increase its holding and gripping action. In the disclosed embodiment six jaws are shown and in larger size members a total of eight jaws or more may be provided. The advantage of a large number of jaws is beneficial electrically as well as mechanically.

This application is a continuation-in-part of my copending application Serial No. 426,174, filed April 28, 1954 and entitled Gripping Member for Line Connectors and now abandoned.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a connector of the character described, a casing having a tapering end portion, a unitary gripping member within said end portion and having sloping exterior surfaces conforming to and having contact with the tapering walls of said end portion, said gripping member having a longitudinal passage extending through the same for receiving a conductor and comprising a plurality of gripping jaws, said gripping jaws being joined to each other at the forward end of the member and each jaw having serrations on its inside surface for contact with said conductor, and said gripping jaws each having an outer surface which is arcuate in transverse section and of such radii compared to the radii of the tapering walls of said end portion that each gripping jaw has contact with the said tapering walls along a central area of the arcuate outer surface and which extends for approximately the length of the gripping jaw.

2. A connector of the character as defined by claim 1, wherein the outer surface of each gripping jaw and which is arcuate in transverse section has radii which are smaller than the radii of the tapering walls of said end portion with which the said jaws are adapted to contact, whereby said contact takes place along a central area of the arcuate outer surface and extends longitudinally of the gripping jaw.

3. In a connector of the character described, a metal casing having a tapering end portion, a gripping member within said end portion and having sloping surfaces adapted to contact with the inside tapering walls of said end portion, said member having a longitudinal passage extending through the same for receiving a conductor and comprising a plurality of gripping jaws, each said gripping jaw on its inside surface having serrations formed therein to facilitate the gripping of said conductor, and said gripping jaws each having an outer surface which is arcuate in transverse section and of such radii compared to the radii of the tapering walls of the end portion that each gripping jaw has contact with the said tapering walls along a central area of the arcuate outer surface and which extends for approximately the length of the gripping jaw.

4. In a connector of the character described, a metal casing having a tapering end portion, a gripping member within said end portion and having sloping surfaces adapted to contact with the inside tapering walls of said end portion, said member having a longitudinal passage extending through the same for receiving a conductor and comprising a plurality of gripping jaws, and said gripping jaws each having an outer surface which is arcuate in transverse section and having radii which are smaller than the radii of the tapering walls of the end portion with which the said jaws are adapted to contact, whereby said contact takes place along a central area of the arcuate surface and extends longitudinally of the gripping jaw for approximately the length thereof.

5. In a connector of the character described, a metal casing having a tapering end portion, a unitary gripping member within said end portion and having sloping surfaces adapted to contact with the tapering walls of said end portion, said member having a longitudinal passage extending through the same for receiving a conductor and comprising a plurality of gripping jaws having connected relation at one end and said member being substantially frustoconical in shape, said gripping jaws being joined to each other at the forward end of the member for a length not in excess of one-third the length of the gripping member, and said gripping jaws each having an outer surface which is arcuate in transverse section and smaller as regards its radii than that of the tapering walls of the end portion with which said outer surface is adapted to contact, whereby contact of each gripping jaw with its tapering wall of the end portion takes place along a longtiudinal central area of the arcuate outer surface thereof and which extends for approximately the length of the gripping jaw.

(References on following page)

References Cited in the file of this patent

UNITED STATES PATENTS

| | | |
|---|---|---|
| 1,165,273 | Miller | Dec. 21, 1915 |
| 1,539,962 | Seufert et al. | June 2, 1925 |
| 1,739,740 | Stoeltzlen | Dec. 17, 1929 |
| 2,041,108 | Becker et al. | May 19, 1936 |
| 2,078,051 | Berndt | Apr. 20, 1937 |
| 2,486,285 | Hurst | Oct. 25, 1949 |
| 2,507,780 | Gilbert | May 16, 1950 |
| 2,554,387 | Saul | May 22, 1951 |
| 2,565,599 | Elliott | Aug. 28, 1951 |